United States Patent

McCall

[11] Patent Number: 5,994,669
[45] Date of Patent: Nov. 30, 1999

[54] BATTERY WARMER WITH TIMER SWITCH

[76] Inventor: Daniel J. McCall, 7123 St. James Sq., St. Louis, Mo. 63139

[21] Appl. No.: 09/195,025

[22] Filed: Nov. 18, 1998

[51] Int. Cl.$^6$ .................................................. H01M 10/50
[52] U.S. Cl. .......................... 219/209; 219/202; 429/120
[58] Field of Search ..................... 219/209, 225, 219/492, 202; 320/2; 180/68.5; 429/7, 62, 120

[56] References Cited

U.S. PATENT DOCUMENTS

| | | | |
|---|---|---|---|
| 2,418,792 | 4/1947 | Riggs | 219/209 |
| 3,110,633 | 11/1963 | Bachmann | 219/202 |
| 3,156,813 | 11/1964 | Trainor | 219/209 |
| 3,469,072 | 9/1969 | Carlson | 219/202 |
| 3,527,925 | 9/1970 | Toyooka et al. | 219/209 |
| 3,649,366 | 3/1972 | Jordan et al. | 219/209 |
| 3,870,855 | 3/1975 | Edlund et al. | 219/209 |
| 4,081,737 | 3/1978 | Miyahara | 320/2 |
| 4,095,938 | 6/1978 | Mikaila | 432/225 |
| 4,378,486 | 3/1983 | Yunik et al. | 219/492 |
| 4,591,692 | 5/1986 | Wightman | 219/209 |
| 5,115,116 | 5/1992 | Reed | 219/202 |
| 5,281,792 | 1/1994 | Lee et al. | 219/209 |
| 5,542,489 | 8/1996 | Allison et al. | 180/68.5 |
| 5,834,131 | 11/1998 | Lutz et al. | 429/7 |

FOREIGN PATENT DOCUMENTS

| | | |
|---|---|---|
| 2718888 | 10/1995 | France . |
| 4216020 | 11/1993 | Germany . |
| 5-256208 | 10/1993 | Japan . |
| 8-98304 | 4/1996 | Japan . |
| 9-213365 | 8/1997 | Japan . |

*Primary Examiner*—John A. Jeffery
*Attorney, Agent, or Firm*—Joseph N. Breaux

[57] ABSTRACT

A vehicle starter battery warming system has a number of heating elements contained within a casing or blanket which is positionable about a vehicle starting battery and which has a on/off control switch and a timed thermostatic control in connection with a separate power supply. The separate power supply may include a second battery if desired or conventional AC power. The timed thermostatic control switch functions to allow the user to intermittently operate the heater at an elevated level if desired while the heating elements operate at continuous set level. Additionally, the thermostat control includes a function for increasing the temperature of the warmer so that prior to the usual starting time of the vehicle or equipment that battery is raised to a higher level.

6 Claims, 3 Drawing Sheets

BATTERY WARMER WITH TIMER SWITCH

TECHNICAL FIELD

The present invention relates to devices and methods for battery warmers and more particularly to devices and methods for a battery warmer that comprises a number of heating elements contained within a casing or blanket and positionable about a vehicle starting battery and having an on/off control switch with a timer and temperature setting therein while a separate power supply which may include either a battery or conventional AC current is provided. The temperature and timer control provides an operational function to allow the heater to be increased in temperature at a set time while a lower continual temperature is maintained throughout the majority of a cold night. Typically the thermostat is set to increase the temperature near the time when a battery on the vehicle and/or equipment is to be used.

BACKGROUND ART

Operating heavy equipment and vehicles in extremely cold weather conditions is often interrupted by an inability to start the vehicles because of the cold temperature draining the batteries. Typically construction workers or other personnel are required to start construction equipment or vehicles by "jumping" the battery, which results in equipment down time and inefficient work. Numerous devices have been described for heating vehicle batteries including the following:

Allison, et al, U.S. Pat. No. 5,542,489 which discloses a battery thermal chamber heated and cooled by air flowing through the chamber.

Reed, U.S. Pat. No. 5,115,116 discloses a vehicle preheating system with preheating devices arranged on key components of the vehicle including the battery with a timer control. This invention is useful for its stated purposes however it does not provide a heating system which has a base heating level which is selectively increased at a set time before the contemplated vehicle starting time.

Wightman, U.S. Pat. No. 4,591,692 discloses a battery warmer which includes a positive temperature coefficient element.

Mikaila, U.S. Pat. No. 4,095,938 which discloses an arctic vehicle battery heater.

Miyahara, U.S. Pat. No. 4,081,737 discloses a secondary battery charger and heater.

Edlund, et al, U.S. Pat. No. 3,870,855 discloses a combination battery charger motor heater and passenger compartment heater.

As can be seen from the prior art there has never been an invention as the present which includes numerous heating elements wrapped around a vehicle and/or heavy equipment battery and further wherein the heater elements are energized by a power supply and which heating elements are maintained at a base heating level and which heating level is increased at a set time to coincide with the use of the battery at early morning hours or at any other desired time. The use of the present invention provides an efficient use of the power necessary to warm the battery which is provided by the dual heating level system. The present system also increases the life of batteries and increases the efficiency of work personnel required to use heavy equipment in cold climates.

GENERAL SUMMARY DISCUSSION OF INVENTION

It is thus an object of the invention to provide a Battery Warmer that maintains a battery at a set temperature over a relatively long period of time while the battery temperature may be increased above the set temperature by a timer and temperature thermostat adjustable by the user.

It is a further object of the invention to provide a Battery Warmer that warms a vehicle or heavy equipment battery so that personnel are not required to jump start or resort to other means for starting the vehicle and/or equipment thereby increasing efficiency of workers.

It is a further object of the present invention to provide a Battery Warmer that warms a vehicle or heavy equipment battery and which battery warmer is built into the case comprising a conventional battery, which includes numerous heating elements wrapped around the battery lying slightly below the surface of the plastic layer comprising the outer case of the battery and which heating element are energized and controlled with power supplied from either conventional AC power or an additional battery mounted in the vehicle or heavy equipment, and which heating elements are controlled with an on/off switch and a timer and temperature control switch. The battery warmer preferably, when switched to an "on" position, operates at a base heating level using minimal power while the heating is increased at a desired time set by the user with the timer and the heating level raised to a set level by the user using the temperature control switch so that the battery is warmed to a higher level only at a time when the user contemplates using the vehicle or heavy equipment.

It is a still further object of the invention to provide a Battery Warmer that includes numerous heating elements contained within a casing or blanket which is positionable about a vehicle or heavy equipment starting battery and which has a on/off control switch in connection with a separate power supply and further wherein the power supply warms the battery at a set level at all times when the switch is switched to the "on" position and further wherein a thermostat and timing control allows a user to adjust a higher heating level at a given time which should coincide with the use of the battery at a given time of the day. The separate power supply for the battery warming system may include a second battery if desired or conventional AC power.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

It can be seen from the following description that in use a user would simply install his/her battery into the battery warmer housing and plug the housing power cord into a one 115V AC power source or into a secondary battery power source. The user would then set the in line thermostatically control switch to the temperature desired and time desired for the unit to activate to a higher temperature setting. The user would then enjoy the benefits of having the battery stay warm during cold weather resulting in far superior performance of the battery while cranking the engine in cold weather. The battery warmer, when it is used in conjunction with a block heater would allow a vehicle to start quickly even on the coldest day in addition to extending the life of the battery due to a shorter cranking cycle. The use of the battery warmer provides a very practical and easy to use method of increasing the likelihood that a vehicle or piece of equipment would start in even the most severe weather conditions. The battery warmer may also be built into a battery and accordingly supplied with a newly purchased battery.

Figure 1:
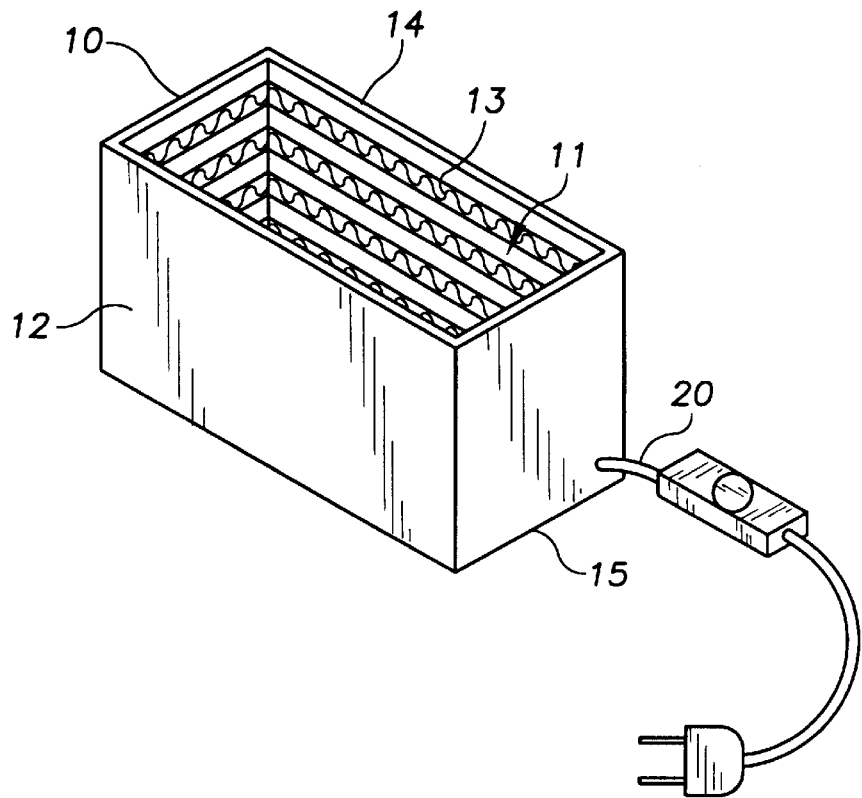
FIG. 1 is an isometric view of the battery warmer with numerous heating elements contained within a battery casing which is positionable about a vehicle or heavy equipment starting battery.

Referring to the figures in detail FIG. 1 illustrates a battery warmer case 10 which has an interior 11 dimensioned to receive a typical vehicle battery. The case 10 has four side walls 12 which completely encircles the battery and a bottom 15. The side walls 12 include numerous heating elements 13 positioned on the interior 11. The heating elements 13 are preferably about one and half to one inches separated from each other and extend from a top edge 14 to the bottom 15 of the case 10. A power supply cord 20 exits one end of the battery warmer 10 and is used to plug the battery warmer into a secondary power supply such as conventional AC power or an additional battery which may be installed on the vehicle. Although the figures illustrate a rigid case, the battery warmer may also be designed as a soft wrappable heating unit that is wrapped around an existing battery.

Figure 2:
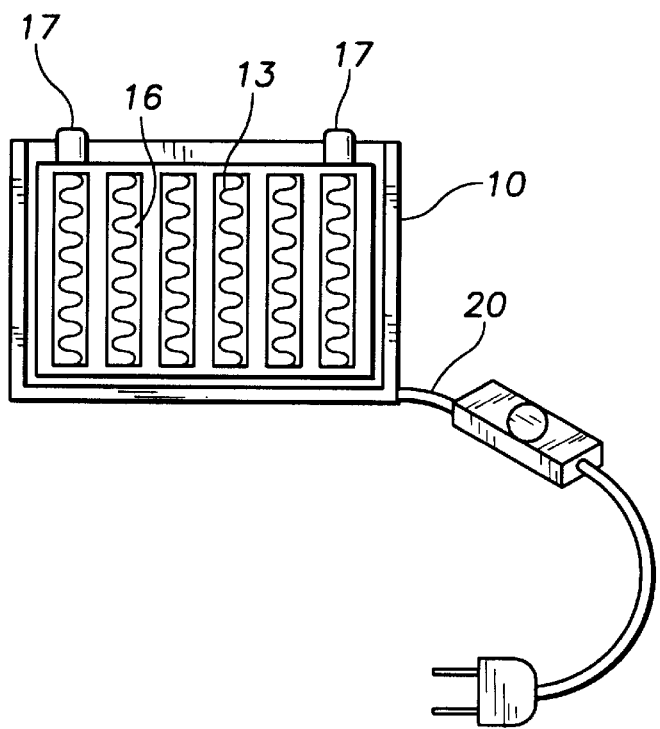
FIG. 2 is a top view showing the interior of the battery warmer casing illustrating the numerous heating elements on the bottom surface of the battery warmer.

FIG. 2 is a top view of the battery warmer case 10 which illustrates the positioning of heating elements 13 on a bottom interior surface 16 of the warmer case 10. Since some batteries have side terminal posts FIG. 2 also illustrates an alternative design with indentions 17 providing a location for the side battery terminals to connect to the battery.

Figure 3:
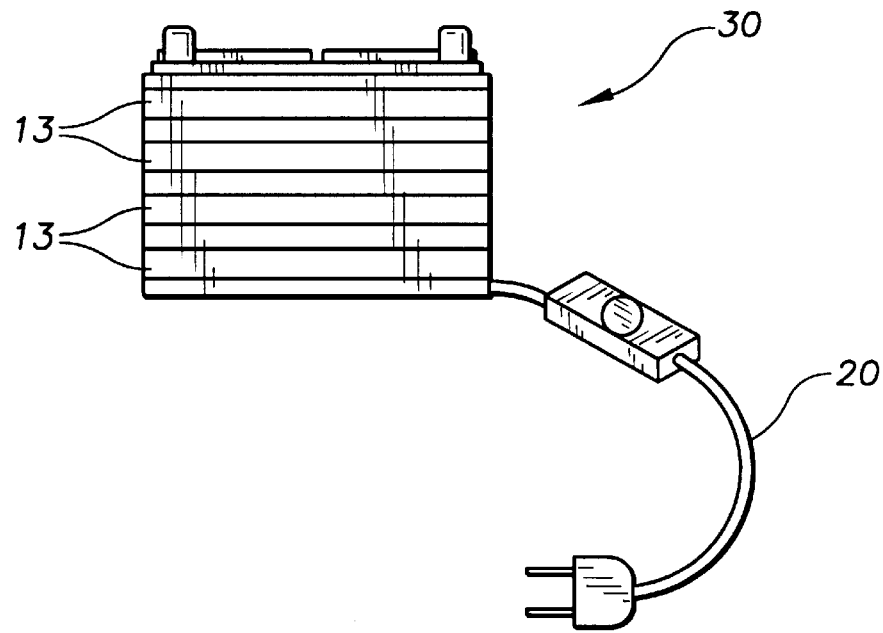
FIG. 3 is a side view of a battery with a built in heater indicating the placement of the heating elements around a battery and which are built into the battery.
Figure 4:
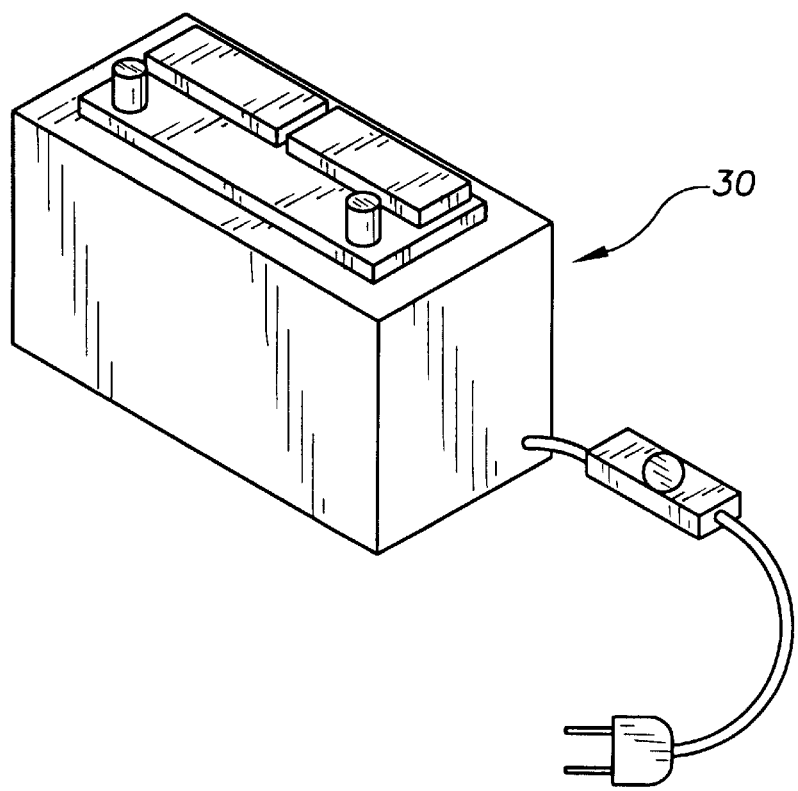
FIG. 4 is an isometric view of a battery with a built in heater indicating the power cord placement.

FIGS. 3 and 4 illustrate an alternative design of the battery warmer 30 wherein the numerous heating coils 13 are built into a battery case and supplied with the battery and sold new as one unit. In this arrangement a user of the system would be required to purchase a battery and heating system as a single unit. The power cord 20 would be identical for either the battery case design 10 or the battery/battery warmer unit 30.

Figure 5:
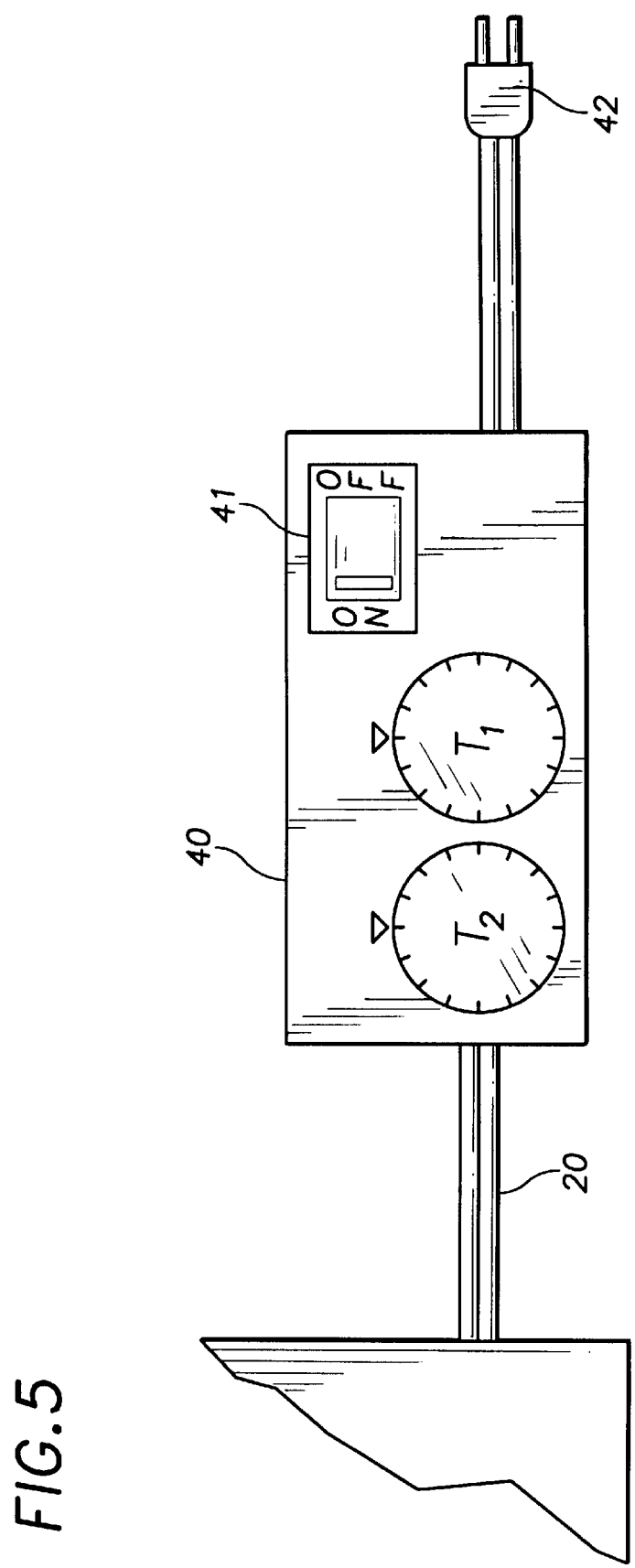
FIG. 5 is an isolated top view of the on/off switch and the thermostatic and time switch.

FIG. 5 illustrates the timed thermostat switch 40 which is positioned in line on the power cord 20 and which would be identical to either the self contained battery and heater unit 30 or the heater case 10. The timed thermostatic controller 40 includes an on/off switch 41, a power cord 42 for plugging the unit into a conventional AC wall outlet, a timer switch designated T1 and a temperature switch designated T2. In use, when the unit is switched to the on position the heating elements in the battery warmer are energized at a pre-set heating level which is equal to preferably and approximately seventy degrees Fahrenheit. If the temperature of the battery exceeds seventy degrees Fahrenheit the pre-set heating level will automatically be switched off. In the event of extremely cold weather and cold temperatures overnight, the pre-set heating level will remain at seventy degrees while the switch is in the on position. The temperature switch T2 provides a means for setting the "second level" of heating that is started at a preset time. T1 is a timer switch which is used to set the time of which the second heating level is desired to begin. Typically, the user would adjust the timer switch T1 to activate the second level heating level to be started preferably about one hour prior to starting work in the morning, this system allows the battery to be warmed throughout the night at a lower level and then increased in temperature before use of the battery. This system decreases the amount of energy consumption for warming the battery and warms the battery only at a elevated level for a short period of time prior to use. The timer and increased temperature switch can be provided for either arrangement of the battery warmer and greatly increases the efficiency of personnel utilizing the vehicle in cold weather.

It is noted that the embodiment of the Battery Warmer described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A battery warmer suitable for warming a starting battery in a vehicle or construction equipment, comprising:
    a) a plurality of flexible heating elements positionable around perimeter sides and a bottom of a starting battery in the vehicle or construction equipment,
    b) a power supply for energizing the heating elements, and
    c) a control system for the controlling heating of the heating elements comprising an on/off switch, a timer switch, and a temperature control switch, wherein the control system operates the heating elements at a first pre set heating level that is activated when the on/off switch is switched to the "on" position, and wherein the control system operates the heating elements at a second heating level which is higher in temperature than the first preset heating level and selected by a user by positioning of the temperature control switch; the second heating level being activated at a time set by the user by positioning the timer switch to a time an hour before a vehicle to which the starting battery is to be used to start.

2. The battery warmer of claim 1, wherein the flexible heating elements further comprise flexible heating elements contained within side walls of a rectangular plastic case and wherein the plastic case comprises an interior dimensioned to receive the battery to be warmed and wherein the flexible heating elements are fixedly secured in side walls of the plastic case and positionable adjacent to four sides of a battery inserted into the plastic case, the flexible heating elements are further arranged on a bottom of the rectangular plastic case.

3. The battery warmer of claim 1, wherein the flexible heating elements further comprise flexible heating elements contained within a flexible blanket dimension to be wrapped around a battery to be warmed.

4. The battery warmer of claim 1, wherein the flexible heating elements further comprise heating elements contained within a battery case wherein the battery case is an integral part of the battery and supplied as a single unit.

5. The battery warmer of claim 1 wherein the power supply further comprises conventional electrical AC power.

6. The battery warmer of claim 1 wherein the power supply further comprises a battery installed on the vehicle and electrically connected to the battery warmer.

* * * * *